United States Patent
Gore et al.

(10) Patent No.: US 11,237,837 B2
(45) Date of Patent: Feb. 1, 2022

(54) SYSTEM AND METHOD FOR MANAGING DEVICES DURING REBOOT

(71) Applicant: Dell Products L.P., Hopkinton, MA (US)

(72) Inventors: Santosh Gore, Bangalore (IN); Rajib Saha, Bengaluru (IN); Raveendra Madala, Bangalore (IN); Krishnaprasad Koladi, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 87 days.

(21) Appl. No.: 16/773,212

(22) Filed: Jan. 27, 2020

(65) Prior Publication Data

US 2021/0232404 A1 Jul. 29, 2021

(51) Int. Cl.
*G06F 9/4401* (2018.01)
*G06F 9/50* (2006.01)

(52) U.S. Cl.
CPC .......... *G06F 9/4401* (2013.01); *G06F 9/5011* (2013.01)

(58) Field of Classification Search
CPC .............................. G06F 9/4401; G06F 9/5011
See application file for complete search history.

(56) References Cited

U.S. PATENT DOCUMENTS

| | | | |
|---|---|---|---|
| 6,708,231 B1 | 3/2004 | Kitagawa | |
| 7,953,913 B2 | 5/2011 | Perry et al. | |
| 8,539,213 B2 | 9/2013 | Zhang et al. | |
| 9,996,142 B2 | 6/2018 | Bulusu et al. | |
| 10,177,997 B1 | 1/2019 | Bromberg et al. | |
| 10,204,011 B1 | 2/2019 | Burriss et al. | |
| 10,324,864 B2 | 6/2019 | Lee et al. | |
| 2003/0204710 A1 | 10/2003 | Culter et al. | |
| 2005/0144609 A1 | 6/2005 | Rothman et al. | |
| 2009/0007089 A1 | 1/2009 | Rothman et al. | |
| 2009/0077407 A1 | 3/2009 | Akimoto | |
| 2009/0307475 A1 | 12/2009 | Fried | |
| 2011/0107073 A1* | 5/2011 | Dalton | G06F 9/4401 713/2 |
| 2011/0143809 A1 | 6/2011 | Salomone et al. | |
| 2011/0238969 A1* | 9/2011 | Warkentin | G06F 9/4416 713/2 |
| 2013/0268922 A1 | 10/2013 | Tiwari et al. | |
| 2014/0157264 A1* | 6/2014 | Russinovich | G06F 9/45545 718/1 |
| 2015/0178097 A1* | 6/2015 | Russinovich | G06F 9/442 713/2 |
| 2016/0266894 A1 | 9/2016 | Panicker et al. | |
| 2017/0357500 A1 | 12/2017 | Vidyadhara et al. | |
| 2019/0004977 A1 | 1/2019 | Fanara et al. | |
| 2019/0042506 A1* | 2/2019 | Devey | H04L 41/0816 |

(Continued)

*Primary Examiner* — Aurel Prifti
(74) *Attorney, Agent, or Firm* — Chamberlain, Hrdlicka, White, Williams & Aughtry

(57) ABSTRACT

An asset includes a physical computing resource. The physical computing resource is directly used by a virtual entity. The asset also includes a resource manager. The resource manager disconnects the virtual entity from the physical computing resource during a low resource consumption reboot of the asset until the low resource consumption reboot of the asset is complete. The resource manager also directly connects the virtual entity to the physical computing resource after the low resource consumption reboot of the asset.

16 Claims, 9 Drawing Sheets

(56) References Cited

U.S. PATENT DOCUMENTS

| | | |
|---|---|---|
| 2019/0079748 A1 | 3/2019 | Chu et al. |
| 2019/0334909 A1* | 10/2019 | Schmitt ................. G06F 3/0604 |
| 2020/0067922 A1* | 2/2020 | Avetisov ............. H04L 63/0884 |
| 2020/0218544 A1* | 7/2020 | Ganesan ................ G06F 9/4406 |
| 2020/0218545 A1 | 7/2020 | Ganesan et al. |
| 2020/0220783 A1* | 7/2020 | Michaud ............. H04L 41/5058 |
| 2020/0333870 A1 | 10/2020 | Vaysman et al. |
| 2021/0232404 A1 | 7/2021 | Gore et al. |

\* cited by examiner

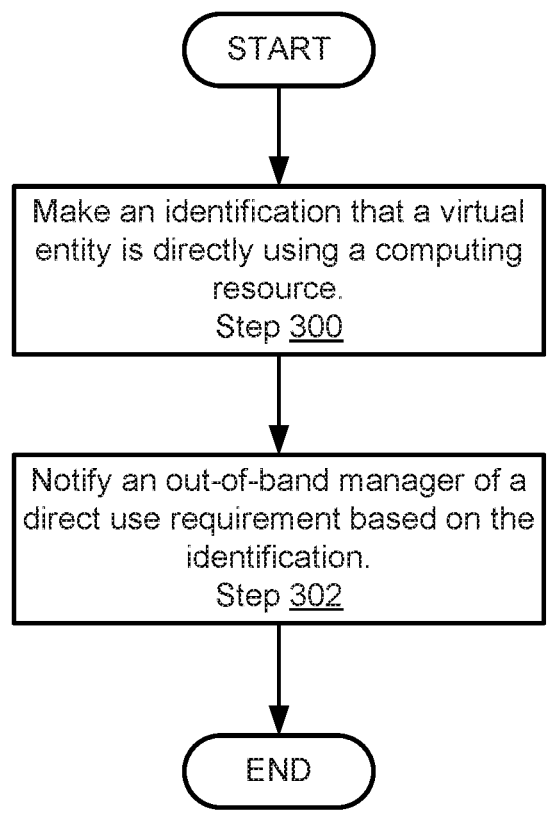
FIG. 3.1

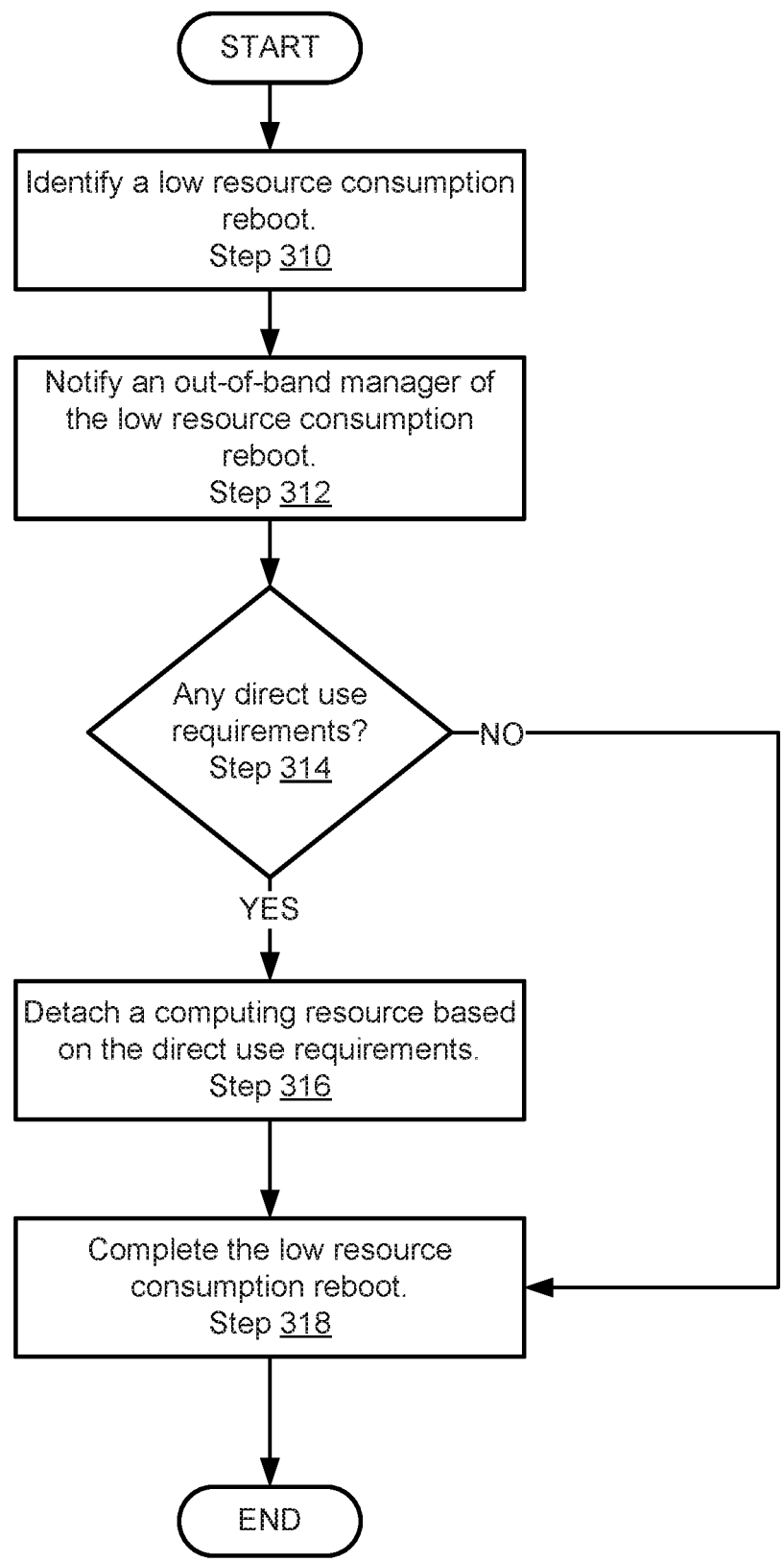
FIG. 3.2

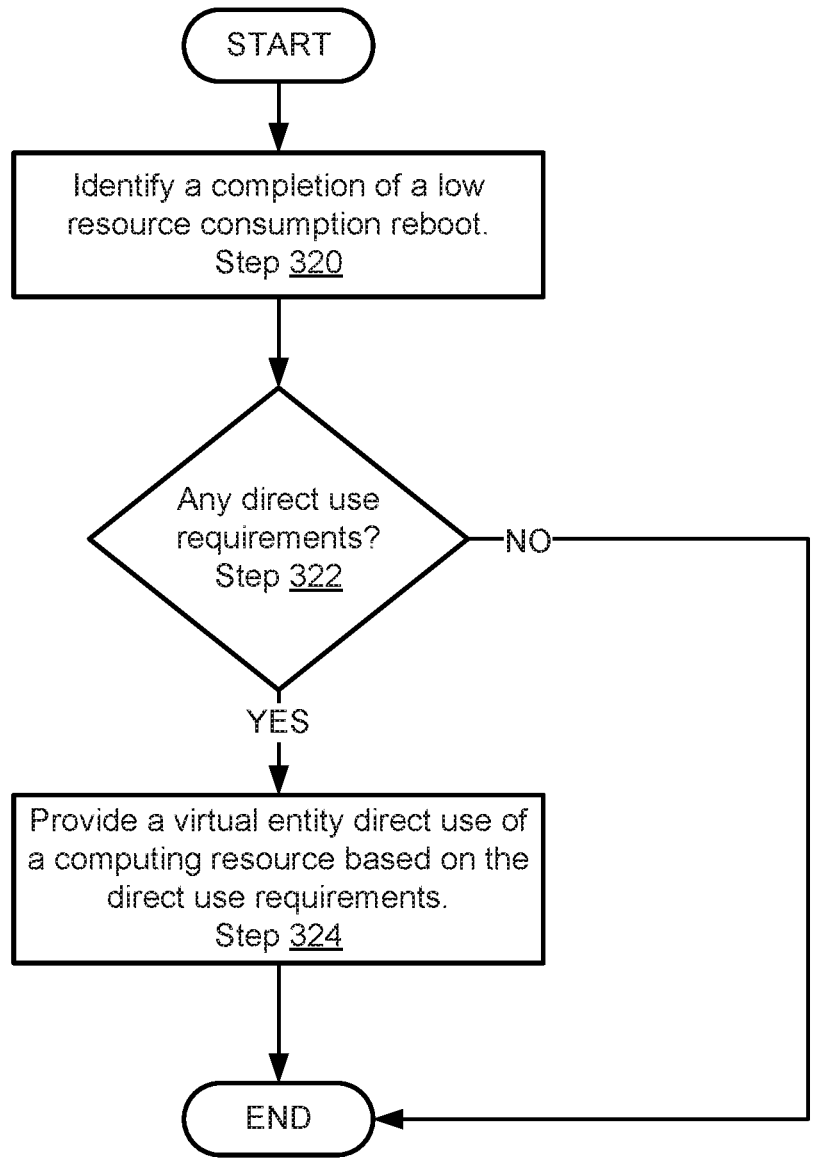
FIG. 3.3

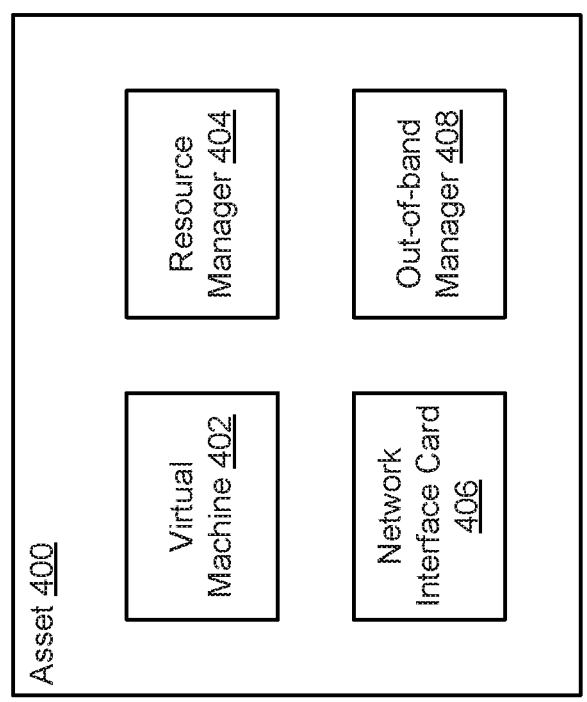
FIG. 4.1

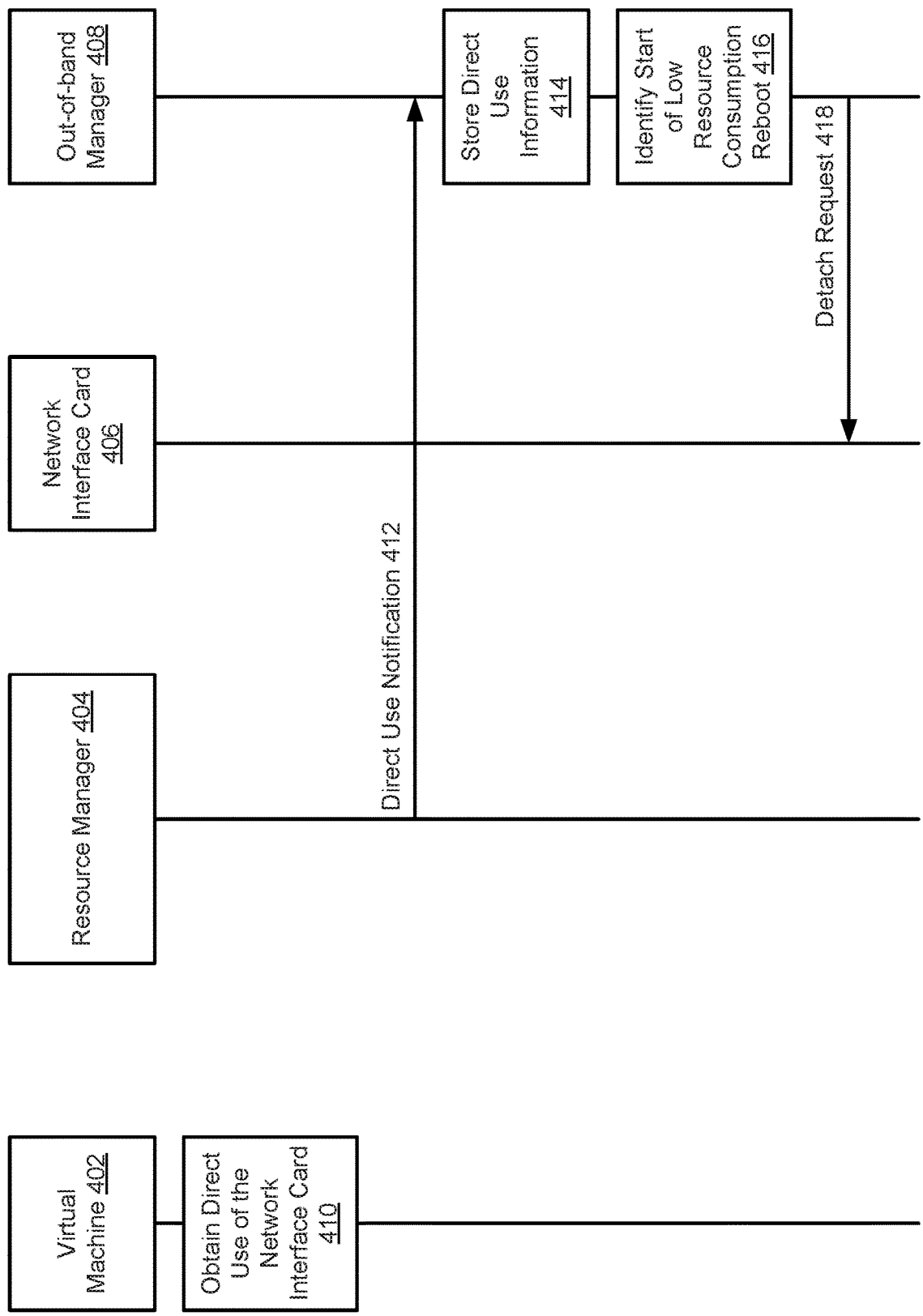
FIG. 4.2

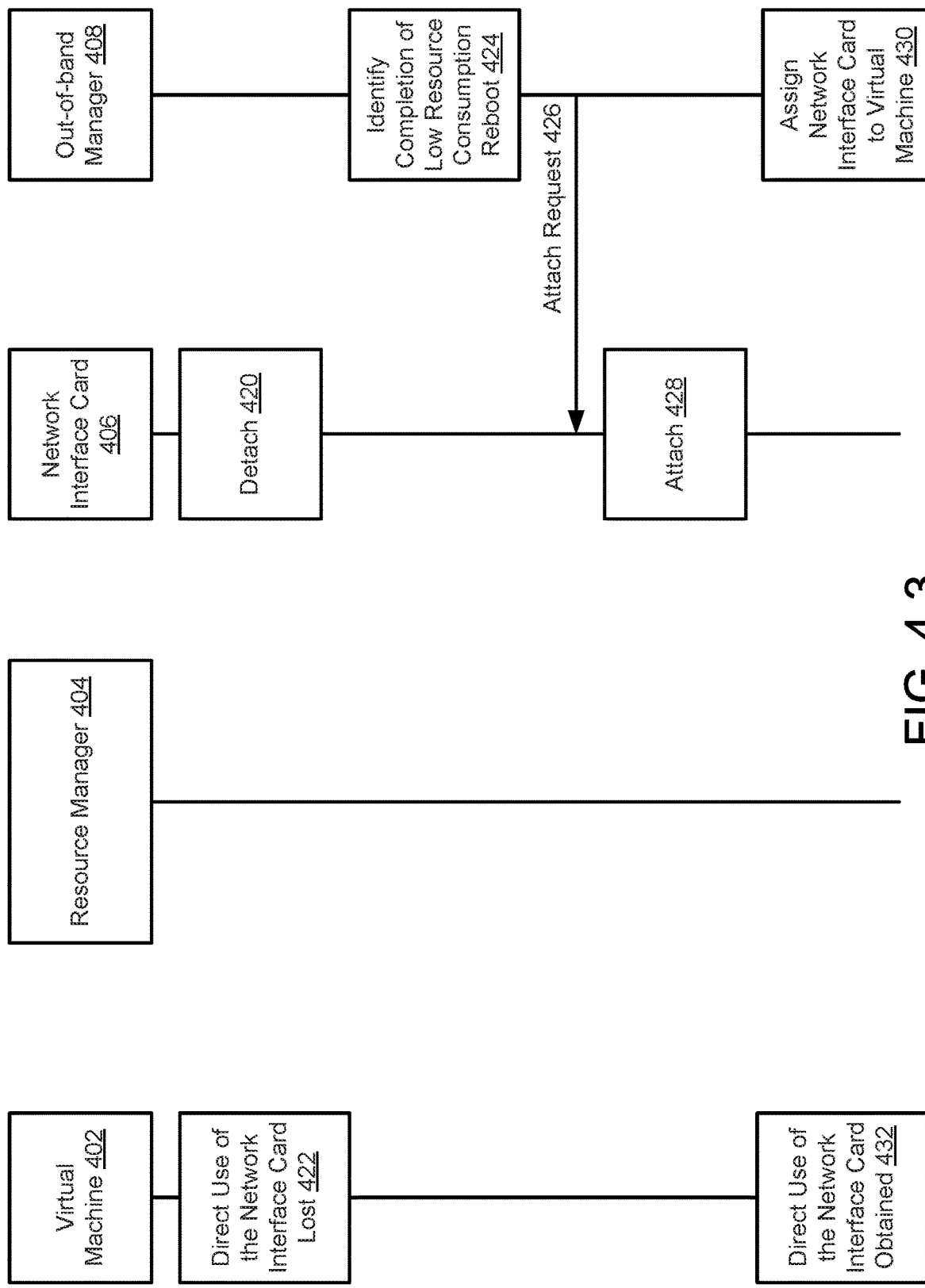
FIG. 4.3

SYSTEM AND METHOD FOR MANAGING DEVICES DURING REBOOT

BACKGROUND

Computing devices may perform services. To provide the services, the computing devices may include hardware components and software components. The software components may utilize the hardware components to provide the services.

SUMMARY

In one aspect, an asset in accordance with one or more embodiments of the invention includes a physical computing resource directly used by a virtual entity and a resource manager. The resource manager disconnects the virtual entity from the physical computing resource during a low resource consumption reboot of the asset until the low resource consumption reboot of the asset is complete; and directly connects the virtual entity to the physical computing resource after the low resource consumption reboot of the asset.

In one aspect, a method for managing an asset that includes a physical computing resource directly used by a virtual entity of the asset includes disconnecting the virtual entity from the physical computing resource during a low resource consumption reboot of the asset until the low resource consumption reboot of the asset is complete; and directly connecting the virtual entity to the physical computing resource after the low resource consumption reboot of the asset.

In one aspect, a non-transitory computer readable medium in accordance with one or more embodiments of the invention includes computer readable program code, which when executed by a computer processor enables the computer processor to perform a method for managing an asset comprising a physical computing resource directly used by a virtual entity of the asset. The method includes disconnecting the virtual entity from the physical computing resource during a low resource consumption reboot of the asset until the low resource consumption reboot of the asset is complete; and directly connecting the virtual entity to the physical computing resource after the low resource consumption reboot of the asset.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 3.1 shows a flowchart of a method for preparing for a low resource consumption reboot in accordance with one or more embodiments of the invention.

FIG. 3.2 shows a flowchart of a method of a low resource consumption reboot in accordance with one or more embodiments of the invention.

FIG. 3.3 shows a flowchart of a method of establishing direct use of computing resources after a low resource consumption reboot is performed in accordance with one or more embodiments of the invention.

FIG. 4.1 shows a diagram of an example system at a first point in time.

FIGS. 4.2-4.3 show diagrams of interactions between and actions performed by components of the example system of FIG. 4.1 over time.

DETAILED DESCRIPTION

Figure 1:
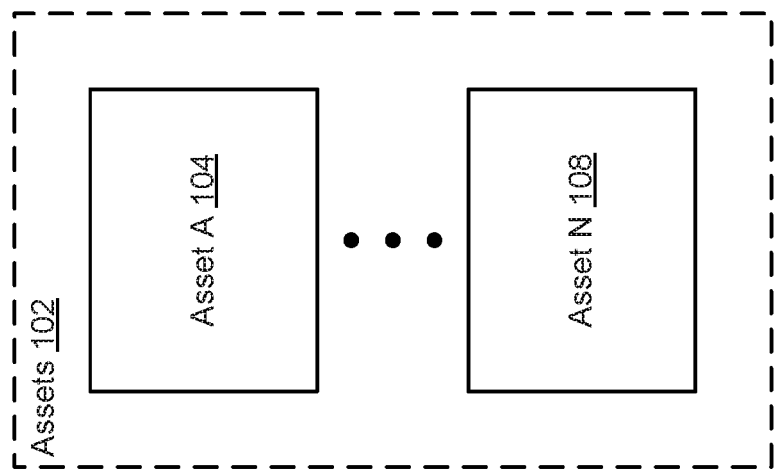
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to systems, devices, and methods for managing computing devices. Managing a computing device may include (i) rebooting the computing devices and (ii) maintaining continuity of direct and indirect use of computing resources as reboots are performed.

A computing device in accordance with embodiments of the invention may preferentially perform low resource consumption boots/reboots. A low resource consumption reboot may be a manner of restarting a computing device that avoids the majority of the steps performed during high resource consumption reboots/boots. The avoided steps may include, for example, one or more of (i) performing an inventory of a computing device, (ii) performing a Power-On Self-Test (POST) of the computing device, (iii) identifying a startup component (e.g., a boot device that manages the process of placing components of the computing device in predetermined states) of the computing device, (iv) updating information used to manage components of the computing device, (v) loading a manager (e.g., an operating system) of the components of the computing device, (vi) placing entities (e.g., applications) in control of the computing device to facilitate providing of computer implemented services, and (vii) restarting/resetting components of the computing device to cause them to load firmware, update setting, or otherwise modify their operation. By avoiding a portion of the aforementioned steps, the time for performing a low resource consumption reboot may be substantially lower than that required to perform a high resource consumption reboot during which a majority (or all) of the aforementioned steps are performed. Consequently, the uptime of the computing device may be greatly improved by preferentially performing low resource consumption boots/reboots.

However, performing a low resource consumption reboot may impact the continuity of direct use of computing resources. For example, when a low resource consumption reboot is performed, information used to provide direct use of the computing resources may be lost. Consequently, the continuity of direct use of the computing resources prior to and after performance of a low resource consumption reboot may be broken.

Embodiments of the invention may provide methods and systems for maintaining the continuity of direct use of computing resources when low resource consumption boots/reboots are performed. Specifically, embodiments of the invention may provide methods and systems that (i) identify direct use of computing resources prior to performance of low resource consumption reboots and (ii) establish direct use of the computing resource after completion of low resource consumption reboots.

By doing so, embodiments of the invention may provide a system that ensures the continuity of direct use of computing resources when low resource consumption reboots are performed.

FIG. 1 shows a system in accordance with one or more embodiments of the invention. The system may include any number of assets (102) that provides computer implemented services. The computer implemented services may include, for example, database services, data storage services, electronic communications services, and/or other types of services that may be implemented using computing devices.

Any number of the assets (e.g., 104, 108) may operate independently or cooperatively to provide the computer implemented services. For example, a single asset (e.g., 104) may provide a computer implemented service on its own (i.e., independently) while multiple other assets may provide a second computer implemented service cooperatively.

To provide the computer implemented services, the assets may utilize computing resources provided by hardware devices of the assets. The computing resources may include, for example, processing resources, storage resources, memory resources, and/or communications resources provided by the hardware devices.

The operation of the assets (102) may require that the assets be rebooted. For example, when updates are obtained, the assets have operated for a duration of time, or for other reasons, the assets (102) may need to be rebooted. If the assets are not rebooted under such conditions, the performance of the assets may be reduced.

Rebooting may refer to a process of placing an asset in a predetermined state. Depending on the predetermined state, performing a reboot may be a computational, time, and/or energy expensive or inexpensive process.

Depending on the desired state, rebooting may include one or more of (i) powering up the asset, (ii) performing an inventory of an asset, (iii) performing a Power-On Self-Test (POST) of the asset, (iv) identifying a startup component (e.g., a boot device that manages the process of placing components of the asset in predetermined states) of the asset, (v) loading information (e.g., ACPI/SMBIOS) used to manage components of the asset, (vi) loading a manager (e.g., an operating system) of the components of the asset, (vii) placing entities (e.g., applications) in control of the asset to facilitate providing of computer implemented services, (viii) restarting/resetting components of the asset to cause them to load firmware, update setting, or otherwise modify their operation, and/or (ix) instantiating virtual interfaces for virtual entities hosted by the assets. Depending on the number of the aforementioned processes performed as part of a rebooting, the rebooting may be a high computational cost reboot or a low computational cost reboot resulting in the asset being placed in corresponding states.

For example, performing a reboot that includes all of the aforementioned processes (e.g., a high resource consumption boot) may be computationally expensive and time consuming. However, doing so may place the asset in a state that matches a desired state based on, for example, updates to the operation of the asset that have been obtained by the asset. In contrast, performing a reboot that includes only a portion of the aforementioned processes (e.g., a low resource consumption reboot) may be comparatively computationally inexpensive and/or quick. However, doing so may place the asset in a state that does not match the desired state. The mismatch between the previous state (e.g., before reboot) and the state of the asset after reboot may include, for example, instantiated virtual interfaces for virtual entities hosted by the asset that include different identifiers (e.g., newly allocated identifiers) used to operably connected the virtualized entities directly to computing resources of the asset (in contrast to being indirectly connected to the computing resources via a hypervisor).

Embodiments of the invention may provide a system and method for performing a low resource consumption reboot of an asset that results in the state of the asset more closely matching a desired state of the asset than would be achieved if only a low resource consumption reboot of the asset is performed.

The components of the system of FIG. 1 may be operably connected to each other and/or other entities via any combination of wired and/or wireless network. Each of the components of the system of FIG. 1 is discussed below.

The assets (102) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the assets (102) described in this application and/or all, or a portion, of the methods illustrated in FIGS. 3.1-3.3. The assets (102) may be implemented using other types of computing devices without departing from the invention. For additional details regarding computing devices, refer to FIG. 5.

As noted above, the assets (102) may provide computer implemented services. To do so, the assets (102) may utilize computing resources of the asset. To utilize the computing resources of the assets, the assets (102) may manage the hardware components of the assets that provide the computing resources. Management of hardware components may include ensuring that virtualized entities that directly use (as opposed to indirectly through a hypervisor) hardware components are able to directly use the hardware components of the asset of a low resource consumption reboot of the asset is performed. For additional details regarding assets (102), refer to FIG. 2.

While the system is illustrated in FIG. 1 as including a limited number of specific components, a system in accordance with embodiments of the invention may include additional, fewer, and/or different components from those illustrated in FIG. 1 and/or discussed above without departing from the invention.

Figure 2:
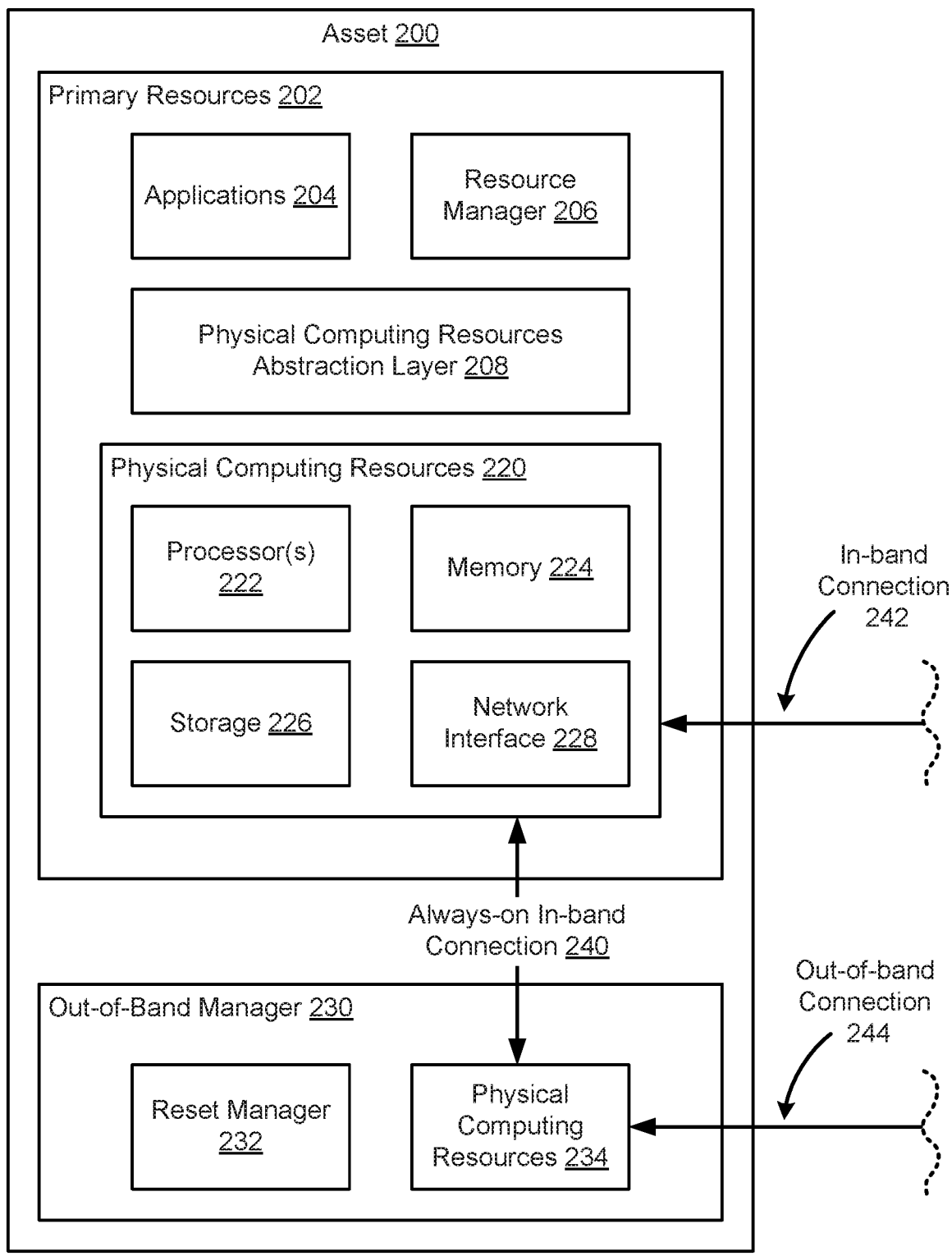
FIG. 2 shows a diagram of an example asset in accordance with one or more embodiments of the invention.

As discussed above, assets may perform low resource consumption reboots to ensure that they are able to continue to provide services at a desired quality of service level. FIG. 2 shows a diagram of an example asset (200) in accordance with one or more embodiments of the invention. The example asset (200) may be similar to any of the assets (102) illustrated in FIG. 1.

As discussed above, the example asset (200) may (i) provide computer implemented services and (ii) ensure that virtualized entities hosted by the assets are able to continue provide computer implemented services by directly using hardware components of the asset even when low resource consumption reboots of the assets are performed.

The example asset (200) may provide any number of computer implemented services. Each of the computer implemented services may provide similar and/or different functionality.

To provide the computer implemented services, the example asset (200) may host any number of applications (204). The applications (204) may include any number and/or type of applications that are hosted by the primary resources (202). In other word, the applications (204) may execute using the physical computing resources (220) of the primary resources (202). The physical computing resources (220) may be provided using hardware devices including processor(s) (222), memory (224), persistent storage (226), and/or a network interface (228).

For example, the applications (204) may be implemented as computer code, i.e., computer instructions, that when executed by one or more processors (e.g., 222) of the primary resources (202) give rise to the functionality of the applications (204). The computer code corresponding to each of the applications (204) may be stored on the persistent storage (226) of the physical computing resources (220) or in other locations (e.g., locally on other persistent storage or remotely on other devices).

The applications (204) may provide any quantity and type of computer implemented services. A computer implemented service may be, for example, electronic communications services, data management services, database services, etc. Any number and type (local and/or remote) of entities may utilize the computer implemented services provided by the applications (204).

For example, an application hosted by the primary resources (202) may provide electronic mail services to an entity that is remote to the example asset (200). In another example, an application hosted by the primary resources (202) may provide database services to other applications hosted by the primary resources (202) and additional applications hosted by other data processing devices operably connected to the example asset (200).

In one or more embodiments of the invention, the applications include virtual machines (e.g., virtual entities) that, in turn, host other applications that provide the computer implemented services. To enable the applications hosted by the virtual machines to execute, the virtual machines may obtain access to the physical computing resources (220) through the physical computing resources abstraction layer (208) (also referred to as "abstraction layer" herein).

The physical computing resources abstraction layer (208) may enable indirect use of the physical computing resources (220) and direct use of the physical computing resources (220).

When using the physical computing resources (220) indirectly, the virtual machines may make calls to a hypervisor or other resource management entity of the physical computing resources abstraction layer (208). The hypervisor may manage execution of the calls (e.g., the use of the physical computing resources (220)) for servicing of the calls. The aforementioned method may provide a large degree of abstraction, which may make accessing the resources easier to implement at the cost of added computational overhead.

When using the physical computing resources (220) directly, virtual interfaces may be utilized by the virtual machines to make direct calls to the physical computing resources (220). In other words, the virtual machines may directly use the physical computing resources via the virtual interfaces rather than through the hypervisor or other management entity.

However, because the interfaces are virtualized rather than real, each time a virtual interface is instantiated the virtual interface may not directly map back to the same real resources of the physical computing resources for which direct access is desired. Consequently, when virtual interfaces are instantiated after, for example, a low resource consumption reboot, the virtual interfaces may no longer be operable as they were prior to the reboot due to the change in configuration of the virtual interface between the virtual machine and the physical computing resource for which direct use is desired.

Embodiments of the invention may provide an asset and system that automatically ensures that direct use of physical computing resources by virtual machines is available after performance of a low resource consumption reboot. To do so, the asset may (i) identify direct use of physical computing resources by virtual entities, (ii) store information regarding the direct use prior to performing a low resource consumption reboot, and (iii) after performing a low resource consumption reboot, modify virtual interfaces for direct use of physical computing resources using the stored information so that direct use is enabled.

To provide the aforementioned functionality, the example asset (200) may include a resource manager (206) that manages direct use of physical computing resources. To do so, the resource manager (206) may (i) monitor the direct and/or indirect use of the physical computing resources (220) by the applications (204), (ii) based on the monitoring, provide information regarding the direct use to an out-of-band manager (230) (e.g., a reset manager (232)), (iii) when a low resource consumption reboot is to start and/or has started, disconnect physical computing resource based on the information regarding the direct use using the out-of-band manager (230), and/or (iv) after the low resource consumption reboot is completed, enable direct use of the physical computing resources by the applications (204) using the information regarding the direct use and/or the out-of-band manager (230).

The resource manager (206) may perform all, or a portion, of the methods illustrated in FIGS. 3.1-3.3 to provide its functionality.

To enable the applications (204) to efficiently utilize the physical computing resources (220), the example asset (200) may include a physical computing resources abstraction layer (208). The physical computing resources abstraction layer (208) may manage the physical computing resources (220) for use by the applications (204) and/or other entities). Managing the physical computing resources (220) may include performing reboots such as low resource consumption reboots.

The physical computing resources abstraction layer (208) may include, for example, a basic input output system (BIOS), any number of boot loaders, any number of operating systems, and/or a hypervisor and/or other software layers if any of the applications (204) are implemented using virtual machines. The aforementioned components may be adapted to perform (i) high resource consumption boots and (ii) low resource consumption boots.

When performing a low resource consumption boot, the physical computing resources abstraction layer (208) may rebuild virtual interfaces or other types of interfaces utilized by the applications (204) to directly use the physical computing resources. Doing so may change the information included in the virtual interfaces thereby degrading and/or eliminating the ability of the applications (204) to directly use the physical computing resources.

In one or more embodiments of the invention, the resource manager (206) and/or the physical computing resources abstraction layer (208) is implemented using a hardware device including circuitry. The hardware device may be, for example, a digital signal processor, a field programmable gate array, or an application specific integrated circuit. The resource manager (206) and/or physical computing resources abstraction layer (208) may be other types of hardware devices without departing from the invention.

In one or more embodiments of the invention, the resource manager (206) and/or physical computing resources abstraction layer (208) is implemented using computing code stored on a persistent storage (e.g., 226) that when executed by a processor performs the functionality of the resource manager (206) and/or physical computing resources abstraction layer (208). The processor may be a hardware processor (e.g., 222) including circuitry such as, for example, a central processing unit or a microcontroller. The processor may be other types of hardware devices for processing digital information without departing from the invention.

The example asset (200) may include an out-of-band manager (230). The out-of-band manager (230) may facilitate managing of direct use of the physical computing resources. To do so, the out-of-band manager (230) may (i) obtain information regarding direct use of the physical computing resources (220) by the applications (204), (ii) disconnect the physical computing resources that are being directly used prior to and/or during a low resource consumption reboot, (iii) reconnect the disconnected physical computing resources after the low resource consumption reboot is complete using the obtained information. By doing so, interfaces between the applications (204) and the physical computing resources (220) may be maintained after completion of a low resource consumption reboot thereby enabling direct use after the reboot (as was available prior to the reboot).

To provide the aforementioned functionality, the out-of-band manager (230) may be operably connected to the primary resources (202) of the example asset (200) via an always-on in-band connection (240). The always-on in-band connection (240) may enable the primary resources (202) and the out-of-band manager (230) to communicate with each other without using the in-band connection (242) or the out-of-band connection (244) that are used by the aforementioned components of the example asset (200) to communicate with other entities.

To provide its functionality, the out-of-band manager (230) may include a reset manager (232) and physical computing resources (234). The reset manager (232) may provide the functionality of the out-of-band manager, discussed above. The out-of-band manager (230) may utilize physical computing resources (234) of the out-of-band manager (230) to provide its functionality. The physical computing resources (234) may include persistent storage (not shown) that may store computer code corresponding to the out-of-band manager (230) that when executed by processor(s) (not shown) of the physical computing resources (234) cause the reset manager (232) to perform the functionality of the out-of-band manager (230).

Figure 5:
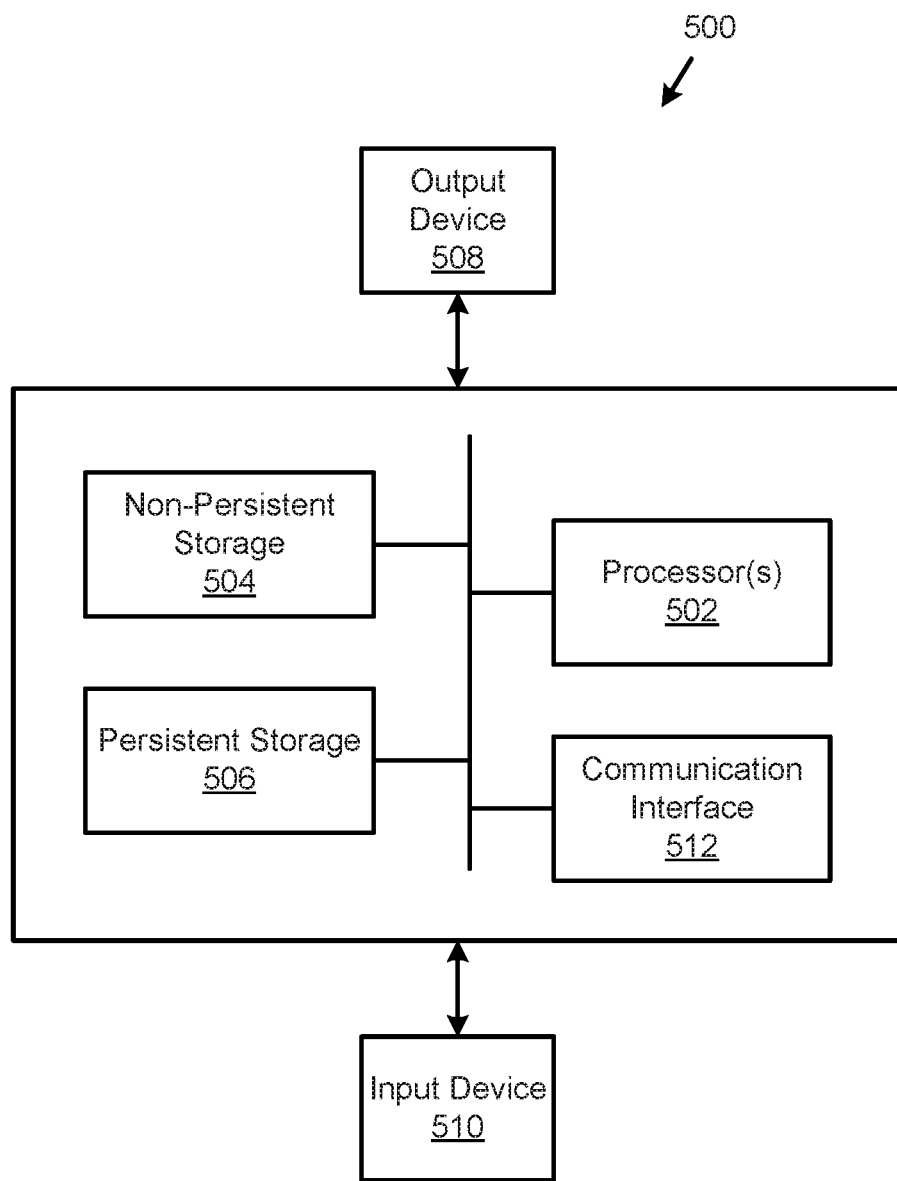
FIG. 5 shows a diagram of a computing device in accordance with one or more embodiments of the invention.

The out-of-band manager (230) may be implemented as a hardware device. For example, the out-of-band manager (230) may be implemented as a circuit card hosted by the example asset (200) (e.g., a device on a bus that interconnects the physical computing resources (220)). The out-of-band manager (230) may operate as a computing device separate from the example asset (200). Refer to FIG. 5 for additional details regarding a computing device.

The out-of-band manager (230) may be implemented as a logical entity. For example, the out-of-band manager (230) may be implemented using a virtual machine hosted by the example asset (200) (e.g., one of the applications (204) that utilizes virtual resources for its execution. In such a scenario, the out-of-band connection (244) and the always-on in-band connection (240) may be implemented as virtual connections supported by logical network interfaces maintained by the example asset (200). The primary resources (202) and the out-of-band manager (230) may each be allocated separate end points on a virtual network supported by the example asset (200).

While illustrated in FIG. 2 as being a portion of the example asset (200), the out-of-band manager (230) may be implemented as a separate physical device without departing from the invention. For example, the primary resources (202) of the example asset (200) may be implemented using a first rack mount server operably connected to a second rack mount server that is used to implement the out-of-band manager (230). The operable connection between the primary resources (202) and the out-of-band manager (230) may serve as an always-on in-band connection (240) while other interconnects serve as the in-band connection (242) and the out-of-band connection.

While the example asset (200) of FIG. 2 is illustrated as including a limited number of specific component, an asset in accordance with embodiments of the invention may include additional, fewer, and/or different components without departing from the invention.

As discussed above, the system of FIG. 1 may ensure that directly used physical computing resources continue to be available for direct use after a low resource consumption reboot is performed. FIGS. 3.1-3.3 show methods that may be performed by components of the system of FIG. 1 to manage the states of the assets.

FIG. 3.1 shows a flowchart of a method in accordance with one or more embodiments of the invention. The method depicted in FIG. 3.1 may be performed to prepare for a reboot in accordance with one or more embodiments of the invention. The method shown in FIG. 3.1 may be performed by, for example, an asset (e.g., 102, FIG. 1). Other components of the system in FIG. 1 may perform all, or a portion, of the method of FIG. 3.1 without departing from the invention.

While FIG. 3.1 is illustrated as a series of steps, any of the steps may be omitted, performed in a different order, additional steps may be included, and/or any or all of the steps may be performed in a parallel and/or partially overlapping manner without departing from the invention.

In step 300, an identification of a virtual entity that is directly using a computing resource is made. The identification may be made by, for example, a resource manager. Other entities may make the identification without departing from the invention.

In one or more embodiments of the invention, the identification is made by monitoring use of physical computing resources of the asset by virtual machines. When a virtual machine is identified as directly using a computing resource, the identification may be made and used, as will be discussed below.

When the identification is method, information about the direct use may be obtained. The information may include, for example, the identity of the virtual machine and the identity of the computing resource. For example, the computing resource may be hardware component such as a processor, a memory module, a network interface card, etc. Additionally, information may be obtained from the resource regarding the use such as, for example, identifiers provided to the virtual machines by the computing resources to enable the use, virtual interfaces provided by the computing resources, and/or other types of information that may enable the use to be established after a low resource consumption reboot is performed.

The information regarding the direct use may be obtained, for example, by requesting it from an abstraction layer, from the virtual machine (or other types of virtual entities), and/or the computing resources.

In one or more embodiments of the invention, the direct use is provided by a Peripheral Component Interconnect Express (PCIe) pass through for the computing resource. A PCIe pass through may enable a virtual entities to directly use a computing resource.

In one or more embodiments of the invention, the direct use is provided by a single-root input/output virtualization (SR-IOV) for the computing resource. A SR-IOV may be an operating mode through which a PCIe device may operate to enable any number of virtual entities to directly use the computing resource. For example, the SR-IOV operating mode may enable any number of virtual functions to be operated by the PCIe device that enables a corresponding number of virtual entities having virtual interfaces to use the corresponding virtual functions to have calls directly serviced by the PCIe device.

Thus, whether implemented via PCIe pass through, SR-IOV operating mode, or another method currently available or as yet undeveloped, information regarding the direct use may be obtained to enable future direct use to be enabled after performance of a low resource consumption reboot.

In step 302, an out-of-band manager is notified of a direct use requirement based on the identification. The direct use requirement may specify that the virtual entity is directly using the computing resource. The direct use requirement may specify additional, less, and/or different information without departing from the invention.

The out-of-band manager may be notified of the direct use requirement by providing information regarding the direct use requirement and/or all, or a portion, of the information obtained in step 300. By doing so, the out-of-band manager may obtain information sufficient to enable the out-of-band manager to enable direct use of the computing resource by the virtual entity when a low resource consumption reboot is performed.

The information may include, for example, an identity of the virtual entity, an identity of the computing resource, and/or information that enables virtual interfaces and/or other entities to be established that enable the virtual entity to directly use the computing resource after a low resource consumption reboot of the asset is completed. The aforementioned information may be stored by the out-of-band manager for future use. The out-of-band manager may have access to (e.g., in storage of the out-of-band manager, stored in other locations, etc.) the aforementioned information and/or similar information for any number of virtual entities.

The method may end following step 300.

Thus, via the method illustrated in FIG. 3.1, an asset in accordance with embodiments of the invention may prepare for performance of a low resource consumption reboot in a manner that ensures (or at least makes more likely) that direct use of computing resources will be available after performance of the low resource consumption reboot.

FIG. 3.2 shows a flowchart of a method in accordance with one or more embodiments of the invention. The method depicted in FIG. 3.2 may be used to perform a low resource consumption reboot of an asset in accordance with one or more embodiments of the invention. The method shown in FIG. 3.2 may be performed by, for example, an asset (e.g., 102, FIG. 1). Other components of the system in FIG. 1 may perform all, or a portion, of the method of FIG. 3.2 without departing from the invention.

While FIG. 3.2 is illustrated as a series of steps, any of the steps may be omitted, performed in a different order, additional steps may be included, and/or any or all of the steps may be performed in a parallel and/or partially overlapping manner without departing from the invention.

In step 310, a low resource consumption reboot is identified. The low resource consumption reboot may be identified by receiving an indication from an abstraction layer (e.g., 208, FIG. 208) of the asset that a low resource consumption reboot is going to be performed. As discussed, the abstraction layer may include an operating system or other entity that may initiate a reboot in response to, for example, user input, obtaining an update that requires an update, in accordance with a reboot schedule or condition that triggers performance of a reboot, etc.

The reboot may be identified by, for example, a resource manager of the asset. The resource manager may be subscribed to receive notifications of when updates are to be performed from the abstraction layer. Consequently, the abstraction layer may automatically notify the resource manager when a reboot is going to be performed in advance or in a manner that provides the resource manager with time to perform the functionality described with respect to FIG. 3.2. The reboot may be identified by other entities and via other means without departing from the invention.

In step 312, the out-of-band manager of the asset is notified of the low resource consumption reboot. The out-of-band manager may be notified by, for example, sending a message to the out-of-band manager, storing information reflecting the reboot in a predetermined location, or via other methods.

In step 314, it is determined whether there are any direct use requirements. The determination may be made by the out-of-band manager using information it previously obtained. Such information may be obtained by, for example, performance of the method illustrated in FIG. 3.1. The information may indicate whether any direct use requirements exist (e.g., any such information may indicate a direct use requirement).

If it is determined that any direct use requirement exists, the method may proceed to step 316. If it is determined that no direct use requirement exists, the method may proceed to step 318.

In step 316, a computing resource is detached based on the direct use requirements. The computing resource may be detached by sending a message from the out-of-band manager to the computing resources indicating that the computing resource is to detach. The computing resource may be detached in other manners without departing from the invention.

Detaching the computing resource may stop direct use of the computing resource. Additionally, virtual interfaces or other logical constructs (e.g., virtual functions provided by the computing resource) used to enable direct use may be eliminated. Consequently, when a low resource consumption reboot is performed subsequent to detachment, dysfunctional interfaces or other logical constructs may not be present (whereas they may be present if a low resource consumption reboot was performed).

In step 318, the low resource consumption reboot is completed.

The method may end following step 318.

Thus, via the method illustrated in FIG. 3.2, an asset in accordance with embodiments of the invention may perform a low resource consumption reboot that does not result in the generation of dysfunctional virtual interfaces or other logical constructs used to enable direct use of the computing resource.

FIG. 3.3 shows a flowchart of a method in accordance with one or more embodiments of the invention. The method depicted in FIG. 3.3 may be used to enable direct use of computing resources after performance of a low resource consumption reboot of an asset in accordance with one or more embodiments of the invention. The method shown in FIG. 3.3 may be performed by, for example, an asset (e.g., 102, FIG. 1). Other components of the system in FIG. 1 may perform all, or a portion, of the method of FIG. 3.3 without departing from the invention.

While FIG. 3.3 is illustrated as a series of steps, any of the steps may be omitted, performed in a different order, additional steps may be included, and/or any or all of the steps may be performed in a parallel and/or partially overlapping manner without departing from the invention.

In step 320, completion of a low resource consumption reboot is identified. The completion may be identified based on, for example, an indication provided by an abstraction layer of the asset. The abstraction layer may manage the low resource consumption reboot and notify any number of entities of the completion.

The reboot may be identified by monitoring. For example, an out-of-band manager hosted by the asset may monitor the asset to identify whether a low resource consumption reboot has been completed.

In step 322, it is determined whether any direct use requirements exist. The determination may be made by the out-of-band manager using information it previously obtained. Such information may be obtained by, for example, performance of the method illustrated in FIG. 3.1. The information may indicate whether any direct use requirements exist (e.g., any such information may indicate a direct use requirement).

If it is determined that any direct use requirement exists, the method may proceed to step 324. If it is determined that no direct use requirement exists, the method may end following step 322.

In step 324, a virtual entity is provided direct use of a computing resource based on the direct use requirements.

The virtual entity may be provided direct use of the computing resource by (i) attaching the computing resource and (ii) instantiating a virtual interface or other logical construct that enables the computing resource to be directly used by the virtual entity.

For example, attaching the computing resource may enable virtual interfaces or other logical constructs to be established. The interfaces or other logical constructs may be instantiated based on the direct use requirements thereby placing them in a condition similar to that, which existed prior to performance of the low resource consumption, reboot as described with respect to FIG. 3.2. Consequently, direct use of the computing resource may be started by the virtual entity after the interfaces or other logical constructs are instantiated.

The virtual interfaces or other logical constructs may be instantiated by, for example, providing an abstraction layer and/or the computing resource with information based on the direct use requirements. The information may include, for example, identifiers, logical to real interface mappings, and/or other information that may enable appropriate virtual interfaces or other logical constructs that were present prior to a low resource consumption reboot to be instantiated after the low resource consumption reboot is performed.

For example, in a scenario where the computing resources are a PCIe device operating in a pass-through mode, the PCIe device may be assigned to the virtual entity. In another example, in a scenario where the computing resources is a PCIe device operating in a SR-IOV mode, virtual functions that were previously used by the virtual entity may be assigned to the virtual entity. Such assignments may be made by provided appropriate information to an abstraction layer.

The method may end following step 324.

Thus, via the method illustrated in FIG. 3.3, an asset in accordance with embodiments of the invention may enable direct use of computing resource after performance of a low resource consumption reboot in a manner consistent with direct use of the computing resource that occurred prior to performance of the low resource consumption reboot.

To further clarify embodiments of the invention, a non-limiting example is provided in FIGS. 4.1-4.3. FIG. 4.1 shows a system similar to that illustrated in FIG. 1. FIGS. 4.2-4.3 illustrate interactions between components and/or actions performed by the components of the system of FIG. 4.1 over time. For the sake of brevity, only a limited number of components of the system of FIG. 1 are illustrated in each of FIGS. 4.1-4.3.

Example

Consider a scenario as illustrated in FIG. 4.1 in which a an asset (400) is providing computer implemented services. To provide the computer implemented services, the asset (400) hosts a virtual machine (402) that hosts an application (not shown) that provides the computer implemented services. The computer implemented services include significant network access. Consequently, a network interface card (406) operating in PCIe pass through mode has just been assigned to the virtual machine (402) for direct use to enable more efficient use of the network interface card (406) than that would be obtained via indirect use via a hypervisor (not shown) that may otherwise manage the use of computing resources by the virtual machine (402).

The asset (400) also hosts an out-of-band manager (408) and a resource manager (404) that enable low resource consumption reboots of the asset to be performed while ensuring that direct use of the network interface card (406) is maintained.

Turning to FIGS. 4.2-4.3, the aforementioned figures illustrate interactions and actions between components of the system of FIG. 4.1. In these figures, the relative occurrence in time of the interactions progresses from the top of each figure (i.e., earlier in time) to the bottom of each figure (i.e., later in time). FIG. 4.3 is a continuation of the diagram of FIG. 4.2. In other words, element 420 indicates the first interaction that occurs in time while element 432 indicates the last interaction that occurs.

Turning to FIG. 4.2, the virtual machine (402) obtains direct use of the network interface card (410), as discussed above. The resource manager (404) identifies the new direct use and sends a direct use notification (412) to the out-of-band manager (408). The direct use notification (412) indicates that the network interface card (410) has been assigned to the virtual machine (402) for direct use.

In response to obtaining the direct use notification (412), the out-of-band manager (408) stores direct use information (414). The direct use information includes an identifier of the virtual machine, an identifier of the network interface card (406), and information indicating that (i) the network interface card (406) is operating in PCIe pass through mode and (ii) is assigned to the virtual machine (402).

Time passes during which the out-of-band manager (408) monitors the asset to ascertain when a low resource consumption reboot is going to be performed. Based on the monitoring, the out-of-band manager (408) identifies a start of a low resource consumption reboot (416). In response to identifying the start of a low resource consumption reboot (416), the out-of-ban manager sends a detach request (418) to the network interface card (406) (e.g., via an always-on in-band channel). The detach request (418) is a request indicating that the network interface card (406) is to detach thereby preventing direct use.

Turning to FIG. 4.3, the network interface card (406) detaches from the asset for direct use purposes prior to completion of the low resource consumption reboot. Consequently, direct use of the network interface card is lost (422) by the virtual machine (402) prior to completion of the low resource consumption reboot.

While the low resource consumption reboot is being performed, the out-of-band manager (408) monitors the asset to ascertain when the reboot is completed. Based on the monitoring, the out-of-band manager identifies completion of the low resource consumption reboot (424).

In response to identifying that the low resource consumption reboot is completed, the out-of-band manager (408) sends an attach request (426) to the network interface card (406) (e.g., via an always-on in-band connection). In response to obtaining the attach request, the network interface card (406) attaches (428) enabling the network interface card (406) to be assigned for PCIe pass through purposes.

The out-of-band manager (408) assigns the network interface card to the virtual machine (430) by sending an appropriate request to an abstraction layer (not shown) which completes the assigned. Once assigned, direct use of the network interface card is obtained (432) by the virtual machine (402) after the low resource consumption reboot of the asset is completed.

End of Example

Thus, as illustrated in FIGS. 4.1-4.3, embodiments of the invention may provide a system that enables assets to be efficiently rebooted facilitating direct use of computing resources by virtual entities after the efficient reboot is completed. By doing so, continuity between direct use of computing resources prior to and after completion of low resource consumption reboots may be maintained.

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

Embodiments of the invention may provide a system and method for performing low resource consumption reboots of devices while maintaining continuity of direct use of computing resources by virtual entities. To do so, embodiments of the invention may provide a system that proactively obtains information regarding the direct use of computing resource prior to performing low resource consumption reboots and establishes direct use of the computing resources after completion of low resource consumption reboots. By doing so, the computational cost for performing a reboot may be reduced (e.g., by avoiding the computational cost for performing a high resource cost reboots) while ensuring direct use continuity is maintained. Consequently, the (i) computational cost for performing a reboot may be reduced, (ii) the time required to perform reboots may be reduced, (iii) the performance of the system may be improved by enhancing its uptime, and/or (iv) the cognitive burden on users of the system may be reduced by removing the need for users to establish direct use of computing resources after low resource cost reboots are performed.

Thus, embodiments of the invention may address the problems of limited computing resources in systems and limited cognitive resources of users of the system.

The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. An asset, comprising:
   a physical computing resource directly used by a virtual entity; and
   a resource manager circuit programmed to:
   prior to disconnecting the virtual entity:
      making an identification that the physical computing resource is directly used by the virtual entity;
      notifying an out-of-band manager of a direct use requirement for the physical computing resource based on the identification;
   disconnect the virtual entity from the physical computing resource during a low resource consumption reboot of the asset until the low resource consumption reboot of the asset is complete; and
   directly connect the virtual entity to the physical computing resource after the low resource consumption reboot of the asset by:
      making a second identification, using the out-of-band manager, of the direct use requirement; and
      in response to making the second identification:
         sending, using the out-of-band manager, a direct connection request to the physical computing resource for the virtual entity to cause the physical computing resource to enter a connected state that enables the virtual entity to directly connect to the physical computing resource; and
         modifying a new virtual interface generated by the low resource consumption reboot to enable direct use of the physical computing resource by the virtual entity.

2. The asset of claim 1, wherein a virtual interface between the physical computing resource and the virtual entity is eliminated by the low resource consumption reboot of the asset.

3. The asset of claim 2, wherein a new virtual interface between the physical computing resource and the virtual entity is formed as part of directly connecting the virtual entity to the physical computing resource.

4. The asset of claim 1, wherein disconnecting the virtual entity from the physical computing resource during the low resource consumption reboot of the asset comprises:
   detaching the physical computing resource using an out-of-band manager.

5. The asset of claim 4, wherein the physical computing resource is detached by sending a detach request via the out-of-band manager to the physical computing resource.

6. A method for managing an asset comprising a physical computing resource directly used by a virtual entity of the asset, comprising:
   prior to disconnecting the virtual entity:
      making an identification that the physical computing resource is directly used by the virtual entity; and
      notifying an out-of-band manager of a direct use requirement for the physical computing resource based on the identification;
   disconnecting the virtual entity from the physical computing resource during a low resource consumption reboot of the asset until the low resource consumption reboot of the asset is complete; and
   directly connecting the virtual entity to the physical computing resource after the low resource consumption reboot of the asset by:
      making a second identification, using the out-of-band manager, of the direct use requirement; and
      in response to making the second identification:
         sending, using the out-of-band manager, a direct connection request to the physical computing resource for the virtual entity to cause the physical computing resource to enter a connected state that enables the virtual entity to directly connect to the physical computing resource; and
         modifying a new virtual interface generated by the low resource consumption reboot to enable direct use of the physical computing resource by the virtual entity.

7. The method of claim 6, wherein a virtual interface between the physical computing resource and the virtual entity is eliminated by the low resource consumption reboot of the asset.

8. The method of claim 7, wherein a new virtual interface between the physical computing resource and the virtual entity is formed as part of directly connecting the virtual entity to the physical computing resource.

9. The method of claim 6, wherein disconnecting the virtual entity from the physical computing resource during the low resource consumption reboot of the asset comprises:
   detaching the physical computing resource using an out-of-band manager.

10. The method of claim 9, wherein the physical computing resource is detached by sending a detach request via the out-of-band manager to the physical computing resource.

11. A non-transitory computer readable medium comprising computer readable program code, which when executed by a computer processor enables the computer processor to perform a method for managing an asset comprising a physical computing resource directly used by a virtual entity of the asset, the method comprising:
   prior to disconnecting the virtual entity:
      making an identification that the physical computing resource is directly used by the virtual entity;
      notifying an out-of-band manager of a direct use requirement for the physical computing resource based on the identification;

disconnecting the virtual entity from the physical computing resource during a low resource consumption reboot of the asset until the low resource consumption reboot of the asset is complete; and directly connecting the virtual entity to the physical computing resource after the low resource consumption reboot of the asset by:

making a second identification, using the out-of-band manager, of the direct use requirement; and in response to making the second identification:

sending, using the out-of-band manager, a direct connection request to the physical computing resource for the virtual entity to cause the physical computing resource to enter a connected state that enables the virtual entity to directly connect to the physical computing resource; and modifying a new virtual interface generated by the low resource consumption reboot to enable direct use of the physical computing resource by the virtual entity.

12. The non-transitory computer readable medium of claim 11, wherein a virtual interface between the physical computing resource and the virtual entity is eliminated by the low resource consumption reboot of the asset.

13. The non-transitory computer readable medium of claim 12, wherein a new virtual interface between the physical computing resource and the virtual entity is formed as part of directly connecting the virtual entity to the physical computing resource.

14. The non-transitory computer readable medium of claim 11, wherein disconnecting the virtual entity from the physical computing resource during the low resource consumption reboot of the asset comprises:

detaching the physical computing resource using an out-of-band manager.

15. The non-transitory computer readable medium of claim 14, wherein the physical computing resource is detached by sending a detach request via the out-of-band manager to the physical computing resource.

16. The non-transitory computer readable medium of claim 11, wherein the method further comprises:

prior to disconnecting the virtual entity:

making an identification that the physical computing resource is directly used by the virtual entity; and notifying an out-of-band manager of a direct use requirement for the physical computing resource based on the identification.

* * * * *